United States Patent
Zook et al.

(10) Patent No.: US 6,486,297 B2
(45) Date of Patent: Nov. 26, 2002

(54) HIGH STRENGTH POLYMERS AND AEROSPACE SEALANTS THEREFROM

(75) Inventors: Jonathan D. Zook, Santa Clarita, CA (US); David W. Jordan, Northridge, CA (US); Dean M. Willard, New York, NY (US); George Jones, Tustin, CA (US); Michael Cosman, Irvine, CA (US)

(73) Assignee: PBT Brands, Inc., Santa Clarita, CA (US)

( * ) Notice: Subject to any disclaimer, the term of this patent is extended or adjusted under 35 U.S.C. 154(b) by 0 days.

(21) Appl. No.: 09/802,369

(22) Filed: Mar. 9, 2001

(65) Prior Publication Data

US 2002/0013449 A1 Jan. 31, 2002

(Under 37 CFR 1.47)

Related U.S. Application Data

(60) Provisional application No. 60/188,105, filed on Mar. 9, 2000.

(51) Int. Cl.$^7$ .............................................. C08G 75/02
(52) U.S. Cl. ........................ 528/373; 528/374; 528/376; 525/330.9; 525/535
(58) Field of Search ................................. 528/373, 374, 528/376; 525/330.9, 535

(56) References Cited

U.S. PATENT DOCUMENTS

| | | | |
|---|---|---|---|
| 2,466,963 A | 4/1949 | Patrick et al. ............. 260/79.1 |
| 2,731,437 A | 1/1956 | Bender et al. .................. 260/42 |
| 3,454,539 A | 7/1969 | Greenlee ....................... 260/79 |
| 3,661,744 A | 5/1972 | Kehr et al. ............. 204/159.14 |
| 3,759,871 A | 9/1973 | Hickner ................... 260/47 EC |
| 3,843,572 A | 10/1974 | Morgan ..................... 260/17 R |
| 3,876,723 A | 4/1975 | Strecker ................. 260/837 R |
| 3,882,091 A | 5/1975 | Villa ........................... 260/79 |
| 3,896,014 A | 7/1975 | Rosenberg ............. 204/159.23 |
| 4,017,554 A | 4/1977 | Villa ....................... 260/830 S |
| 4,045,317 A | 8/1977 | Larsen .................. 204/159.23 |
| 4,104,283 A | 8/1978 | Hickner ................. 260/348.43 |
| 4,136,086 A | 1/1979 | Baumann et al. ............. 528/99 |
| 4,366,307 A | 12/1982 | Singh et al. ................. 528/373 |
| 4,609,762 A | 9/1986 | Morris et al. .................. 568/38 |
| 4,921,927 A | 5/1990 | Hefner, Jr. et al. ........... 528/87 |
| 5,225,472 A | 7/1993 | Cameron et al. ........... 524/368 |
| 5,429,772 A | 7/1995 | Castellucci et al. ......... 252/514 |
| 5,912,319 A | 6/1999 | Zook et al. ................. 528/373 |
| 5,959,071 A | 9/1999 | DeMoss et al. ............. 528/378 |
| 6,069,211 A | 5/2000 | Reyes, Jr. et al. .......... 525/523 |
| 6,172,179 B1 | 1/2001 | Zook et al. ................. 528/373 |
| 6,232,401 B1 | 5/2001 | Zook et al. ................. 525/191 |

*Primary Examiner*—Duc Truong
(74) *Attorney, Agent, or Firm*—Gifford, Krass, Groh, Sprinkle, Anderson & Citkowski, P.C.

(57) ABSTRACT

A polythioether is provided of the formula

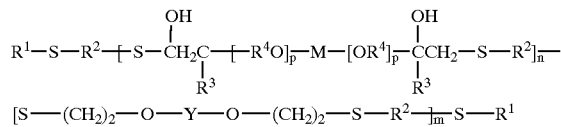

wherein $R^1$ is H, $C_{1-6}$ alkyl, $C_{1-6}$ alkyl alcohol, $C_{1-6}$ alkyl substituted with at least one of:

—$(CH_2)_2$—O—Y—O—CHCH$_2$  or

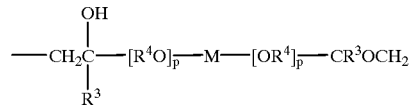

—NHR$^5$ wherein $R^5$ is a $C_{1-6}$ alkyl, $R^2$ is $C_{2-6}$ alkyl, $C_{6-8}$ cycloalkyl, $C_{6-10}$ alkylcycloalkyl, —[—(CH$_2$)$_r$—Q—]$_s$—(CH$_2$)$_r$—, or $C_{1-2}$ alkyl substituted forms thereof, wherein r is an integer value from 2 to 8, Q is a heteroatom selected from the group consisting of: O, S, —NH— and —NCH$_3$—, s is an integer value from 1 to 5, and t is an integer value from 2 to 10, $R^3$ is H or $C_{1-4}$ alkyl, $R^4$ is —CH$_2$— or $R^2$, M is a $C_{1-10}$ alkyl, $C_{6-20}$ aryl, $C_{6-20}$ aryl substituted with at least one $C_{1-8}$ alkyl group, or a N or O heteroatom, Y is $C_{2-20}$ alkyl, $C_{6-20}$ cycloalkyl, $C_{6-10}$ alkylcycloalkyl, or —[—(CH$_2$)$_r$—Q—]$_s$(—CH$_2$—)$_r$—, n is an integer value from 1 to 60, m is an integer value from 1 to 60, and p is an integer value from 1 to 10, wherein the polythioether has a viscosity at 20° C. of less than 1000 poise.

23 Claims, No Drawings

US 6,486,297 B2

HIGH STRENGTH POLYMERS AND AEROSPACE SEALANTS THEREFROM

RELATED APPLICATION

This application claims priority of U.S. Provisional Patent Application 60/188,105 filed Mar. 9, 2000, and is incorporated herein by reference.

FIELD OF THE INVENTION

The present invention relates to a polymer and process for making the same, more particularly to a polythioether formed by a process of combining a polythiol, polyepoxide and a polyvinyl ether.

BACKGROUND OF THE INVENTION

Thiol-terminated sulfur-containing polymers have a long history of use in aerospace sealants because of their fuel resistant nature upon cross-linking. Among the commercially available polymeric compounds having sufficient sulfur content to exhibit this desirable property are the polysulfide polymers described, e.g., in U.S. Pat. No. 2,466,963 and sold under the trade name LP® polysulfide by Morton International of Chicago, Ill., and the alkyl side chain containing polythioether polymers described, e.g., in U.S. Pat. No. 4,366,307 that are sold only in complete sealant formulations by PRC-DeSoto International, Inc. of Glendale, Calif. In addition to fuel resistance, polymers useful in this context must also have the desirable properties of low temperature flexibility, liquidity at room temperature, high temperature resistance, a reasonable cost of manufacture, and not be so malodorous as to prevent commercial acceptance of compositions that contain the subject polymers.

Air frame manufacturers are actively striving to increase productivity by using faster curing aerospace sealants. Hand mixing and application are still common in the aerospace industry owing to high production standards, and as such, an aerospace sealant formulation requires a relatively long application life. For example, prior art manganese dioxide cured polysulfide sealants had a two hour application life and required about a two day cure to attain a Shore A hardness of 30. Current aerospace sealants are expected to have an application life of two to three hours and obtain a Shore A hardness of 30 in less than eight hours.

Until now, aerospace sealants based upon these sulfur-containing polymers have been crosslinked by oxidation of the thiol terminal groups with metal oxides or peroxides. Optimum properties with regard to elasticity are obtained by curing with manganese dioxide. Unfortunately, such sealants, when continuously exposed to modem mercaptan containing aviation fuels, e.g., as in integral fuel tank sealing applications, exhibit polymer chain degradation as evidenced by a phenomena known as "chalking."

Another disadvantage of these systems has only recently come to light. Aircraft manufacturers, in an effort to increase the fuel economy of their airplanes, have an active program in place to reduce the weight of components they use. Sealant manufacturers have responded to this request for lower density sealants by incorporating lightweight fillers. The disadvantage with this approach is that only a relatively small quantity of these fillers can be used without dramatically decreasing the sealant's physical strength.

Only recently, the specific gravity of aerospace sealants has been reduced from the 1.6–1.8 range down to a minimum of approximately 1.0. Those skilled in the art have attained this specific gravity by incorporating fine hollow spheres and compensating for the loss in physical strength by additions of more highly reinforcing fillers and pigments such as precipitated calcium carbonate or fuimed silica. The flaw with this approach is that the more highly reinforcing fillers have higher surface areas and in most cases higher oil absorptions. This higher surface area results in increased pigment-polymer interactions resulting in a dramatically increased viscosity. These higher viscosities negatively impact application properties and adhesion.

SUMMARY OF THE INVENTION

A polythioether is provided of the formula $$R^1-S-R^2+\!\!\!\!-S-\underset{R^3}{\overset{OH}{\underset{|}{C}H_2C}}\!\!\!\!\!\!\!\!\!-\!\!\!\!\!\!\!\!-[R^4O]_{\overline{p}}-M-[OR^4]_{\overline{p}}-\underset{R^3}{\overset{OH}{\underset{|}{C}CH_2}}-S-R^2\!+\!\!\!\overline{n}$$

$$[S-\!\!\!\!-(CH_2)_2-\!\!\!\!-O-\!\!\!\!-Y-\!\!\!\!-O-\!\!\!\!-(CH_2)_2-\!\!\!\!-S-\!\!\!\!-R^2\!+\!\!\overline{m}\,S-\!\!\!\!-R^1$$

wherein $R^1$ is H, $C_{1-6}$ alkyl, $C_{1-6}$ alkyl alcohol, $C_{1-6}$ alkyl substituted with at least one of:

$$-\!\!\!\!-(CH_2)_2-\!\!\!\!-O-\!\!\!\!-Y-\!\!\!\!-O-\!\!\!\!-CHCH_2 \quad \text{or}$$

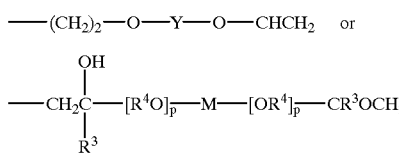

$-NHR^5$ wherein $R^5$ is a $C_{1-6}$ alkyl, $R^2$ is $C_{2-6}$ alkyl, $C_{6-8}$ cycloalkyl, $C_{6-10}$ alkylcycloalkyl, $-\![-(CH_2)_r-Q-]_s-(CH_2)_t-$, or $C_{1-2}$ alkyl substituted forms thereof, wherein r is an integer value from 2 to 8, Q is a heteroatom selected from the group consisting of: O, S, —NH— and —NCH$_3$—, S is an integer value from 1 to 5, and t is an integer value from 2 to 10, $R^3$ is H or $C_{1-4}$ alkyl, $R^4$ is —CH$_2$— or $R^2$, M is a $C_{1-10}$ alkyl, $C_{6-20}$ aryl, $C_{6-20}$ aryl substituted with at least one $C_{1-8}$ alkyl group, or a N or O heteroatom, Y is $C_{2-20}$ alkyl, $C_{6-20}$ cycloalkyl, $C_{6-10}$ alkylcycloalkyl, or $-\![-(CH_2)_r-Q-]_s-(-CH_2-)_t-$, n is an integer value from 1 to 60, m is an integer value from 1 to 60, and p is an integer value from 1 to 10, wherein the polythioether has a viscosity at 20° C. of less than 1000 poise. Preferably, the polythioether has a number average molecular weight between about 1000 and about 10,000 Daltons. A polyfunctionalizing agent is optionally provided in order to increase the functionality of a polythioether from 2 to 5 with the most preferred range being 2 to 3.

A process for forming such a polythioether includes the steps of reacting a polythiol with either an aromatic polyepoxide or a polyvinyl ether to form a prepolymer. The prepolymer is then combined with the other of the aromatic polyepoxide or the polyvinyl ether. The use of such a polythioether is contemplated as an aerospace sealant.

DETAILED DESCRIPTION OF THE INVENTION

It has surprisingly been discovered that the combination of certain polythiols with polyepoxides and oxygenated dienes according to the invention results in polythioether polymers that are liquids at room temperature and pressure. Further, these new polythioether polymers are higher in strength than either conventional polysulfide or polythioether polymers. Despite the increase in physical strength, polymer formulations consistent with this invention do not sacrifice other desirable physical and chemical properties inherent with polythioether polymers. The polythioether polymers of the present invention are substantially free of both malodorous cyclic byproducts and deleterious catalyst residues, and hence have superior thermal resistance properties. The inventive polythioethers have utility as aerospace sealants.

According to the invention, the combination of polythiols with polyepoxides and oxygenated dienes may be represented as follows:

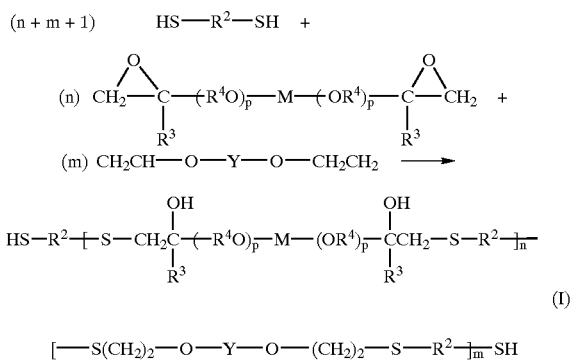

Suitable polythiols include the dithiols wherein $R^2$ is a $C_{1-10}$ alkyl or aryl and may or may not contain a heteroatom. Substituents on $R^2$ are those which do not interfere with the reaction of the polythiol with either a polyepoxide or polydiene. Thus, $R^2$ is free of reactive unsaturated carbon to carbon bonds, as well as highly water sensitive species. Preferred heteroatoms are S and O. Preferred dithiols include straight chain aliphatic dithiols with a chain length of two to six carbon equivalents, dimercaptodiethylene (DMDE), dimercaptodiethylsulfide (DMDS), dimercaptodioxaoctane (DMDO), dipentene dimercaptan, and vinylcyclohexane dimercaptan. Additional operative dithiols are recited in U.S. Pat. No. 5,912,319.

Suitable polyepoxides include those wherein group M is a $C_{2-10}$ alkyl, $C_{6-20}$ aryl, $C_{6-20}$ aryl substituted with at least one $C_{1-8}$ alkyl group, or a N or O heteroatom. Suitable polyepoxide compounds operative herein are recited in U.S. Pat. No. 4,136,086. Preferably, polyepoxides according to the present invention contain an aryl group within M. It has been discovered that an aryl backbone component synergistically operates with the hydroxyl groups associated with thiol epoxide reaction to form a superior strength and handling property polythioether polymer. $R^3$ of an inventive polyepoxide reagent is hydrogen or $C_1-C_4$ alkyl. Preferably, $R^3$ is hydrogen or a methyl group. $R^4$ is methylene or any of the substituents denoted as the polythiol $R^2$. P is an integer value ranging from 1 to 10. Additionally operative polyepoxides include the diglycidylether of bisphenol A (such as EPON 828®, Shell Chemicals Ltd.), diglycidylether of bisphenol F (such as ERISYS™, CVC), any of the lower functionality Novolaks (such as DEN 431™, The Dow Chemical Co.), as well as butane- and hexane-diol diglycidyl ether (such as ARALDITE®, Ciba-Geigy).

Suitable polyvinyl ethers include those wherein group Y is $C_{2-10}$ alkyl, $C_{6-10}$ cycloalkyl, $C_{6-10}$ alkyl cycloalkyl or $—[—(CH_2)_r—O—]_s—(CH_2)_t—$, where r is an integer value between 1 and 8, s is an integer value between 1 and 5, and t is an integer value between 2 and 10. Preferred polyvinyl ethers include the divinylethers of ethylene glycol, butanediol, hexanediol, diethylene glycol, triethylene glycol and tetraethylene glycol. Additionally, a blend of two or more of these divinyl ethers are equally suitable and are within the scope of this invention. Commercial blends of divinyl ethers are available from BASF under the trade name PLURIOL® and from International Specialty Products under the product designation "DPE."

In the representative reaction scheme illustrated above, the subscripts n and m are chosen such that the resulting polymer has a molecular weight, Tg, and room temperature viscosity within the requisite range, for example, of an aerospace sealant, and such that m>n. Preferred molecular weight includes 1000–6000 Daltons. In one embodiment, Tg should be as low as possible but below –40° C. Finally, room temperature viscosity should be below 1000 poise.

In another embodiment, the inventive polythioether is greater than difunctional and is represented by the formula: $B—(I-R^1)_z$ where B is a z-valent residue of a polyfunctionalizing agent, z is an integer value from 3 to 6, I is the resulting polythioether of Formula I less the terminal hydrogen groups, and $R^1$ is H, $C_{1-6}$ alkylene, $C_{1-6}$ alkyl alcohol, $C_{1-6}$ alkyl substituted with at least one of:

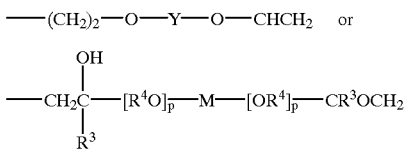

Preferably, the average functionality, as defined as the number of reactive groups per polythioether molecule, ranges between about 2.05 and about 3.00.

While in the first preferred embodiment of the present invention as summarized by Formula I, an excess of dithiol is present to assure thiol termination of the resulting polythioether polymer, it is appreciated that by varying the relative amounts of polythiol relative to polyepoxide or polyvinyl ether, that polymers can be prepared that have not only terminal thiol groups, but terminal vinyl or epoxide groups. Furthermore, the polythioether polymers thus formed need not be further reacted prior to cure or, alternatively, are further reacted with other compounds to form capped polythioether polymers. Capping of polythioethers of the present invention affords the opportunity to include additional terminal functionalities into the inventive polymers. Such capping moieties illustratively include hydroxyl groups, secondary amine groups and alkyl groups.

In aerospace sealant applications, the polythioether polymer derived according to the invention may be combined with suitable lightweight fillers. Typically, a polythioether polymer is present at from about 40 to about 80 weight percent, 0.3 to 1.5 weight percent lightweight fillers or 10 to 50 weight percent of conventional inorganic fillers, 0.1 to 2 weight percent curing agent, and the remainder of the composition optionally including one or more additives of: pigments, cure accelerators, surfactants, adhesion promoters, thixotropic agents and solvents. Suitable lightweight fillers for use in this invention may be organic, inorganic, or a composite of both. They fall within two categories—microspheres and amorphous fillers. The amounts of the microspheres and amorphous lightweight fillers used in the composition of the invention may be from about 0.3 to about 10 percent and from about 4 to 15 percent of the total weight of the composition, respectively. The specific gravity (s.g.) of the microspheres ranges from about 0.1 to 0.7 and are exemplified by polystyrene foam, microspheres of polyacrylates and polyolefins, and silica microspheres having particle sizes ranging from 5 to 100 microns and a specific gravity of 0.25 (ECCOSPHERES®, W. R. Grace & Co.). Other examples include alumina/silica microspheres having particle sizes in the range of 5 to 300 microns and a specific gravity of 0.7 (FILLITE®, Pluess-Stauffer International), aluminum silicate microspheres having a specific gravity of from about 0.45 to about 0.7 (Z-LIGHT®), and calcium carbonate-coated polyvinylidene copolymer microspheres having a specific gravity of 0.13 (DUALITE 6001AE®, Pierce & Stevens Corp.).

Suitable amorphous lightweight fillers for use in this invention have a specific gravity ranging from about 1.0 to about 2.2 and are exemplified by calcium silicates, fumed silica, precipitated silica, and polyethylene. Examples include calcium silicate having a specific gravity of from 2.1 to 2.2 and a particle size of from 3 to 4 microns (HUBERSORB HS-600®, J. M. Huber Corp.) and fumed silica having a specific gravity of 1.7 to 1.8 with a particle size less than 1 (CAB-O-SIL TS-720®, Cabot Corp.). Other examples include precipitated silica having a specific gravity of from 2 to 2.1 (HI-SIL TS-7000®, PPG Industries), and polyethylene having a specific gravity of from 1 to 1.1 and a particle size of from 10 to 20 microns (SHAMROCK S-395®, Shamrock Technologies Inc.).

EXAMPLE 1

Into a 5-L round bottom flask equipped with an air driven stirrer, thermometer, and a condenser, was added 312 g (1 mol) of diglycidylether of bisphenol F and 1848 g (12 mol) of dimercaptodiethyl sulfide (DMDS). After several minutes of stirring, the mixture exothermed to 45° C. After 30 minutes, the temperature of the flask was increased 75° C., and a mixture of 1140 g (10 mol) of ethyleneglycol divinylether and 16.5 g (0.09 mol) of an azobisnitrile free radical catalyst (VAZO® 67>2,2'-azobis(2-methylbutyronitrile), commercially available from DuPont) was added dropwise. The reaction proceeded substantially to completion after 2 hours to afford 3300 g (1.0 mol, yield 100%) of a liquid polythioether resin having a Tg of −40° C. and a viscosity of 400 poise. The resin was yellow and had mild odor.

To demonstrate the utility of this invention, the polythioether polymer from the above example was compared to the polythioether described in Example 16 of U.S. Pat. No. 4,366,307. To compare the properties of these two polymers, the following sealant formulation set forth in Table I was prepared (all numbers are parts by weight) using a Ross Powermixer:

TABLE I

| Ingredient | Parts by weight used |
|---|---|
| Polythioether polymer | 100 |
| Calcium Carbonate | 20 |
| Strontium Chromate | 7.5 |
| Isopropyl Alcohol | 3 |
| Lightweight Filler | 7.5 |
| Catalyst-diazabicyclooctane | 1 |

Each compounded polymer is cured by intimate mixing with an epoxy resin curing agent (DEN 431) in a stoichiometric ratio of 1. Samples are allowed to cure for 7 days at ambient temperature and humidity. Table II compares various physical properties obtained for the curing compositions:

TABLE II

| Property | Inventive Composition | Example 16 Polymer |
|---|---|---|
| Cure Hardness, Shore A | 55 | 50 |
| Tensile Strength at Break, psi | 520 | 360 |
| Elongation at Break, % | 600 | 400 |
| Low Temperature Flexibility | Pass | Pass |
| Peel Strength, Initial, lbs/in-width | 45 | 30 |
| Peel Strength, After 7 days Immersion in Aviation Fuel, lb/in-width | 30 | 18 |
| Specific Gravity | 1.05 | 1.01 |

EXAMPLE 2

The reaction of Example 1 is repeated with the exception that 12 mols of ethyleneglycol divinylether is added instead of 10 mols of ethyleneglycol divinylether. The resulting liquid polythioether has a comparable Tg and a viscosity of 450 poise. The resulting liquid polythioether is vinyl terminated.

All patents and publications cited herein are hereby incorporated by reference to the same extent as if each individual patent or publication was explicitly and individually incorporated by reference.

What is claimed is:

1. A polythioether comprising:

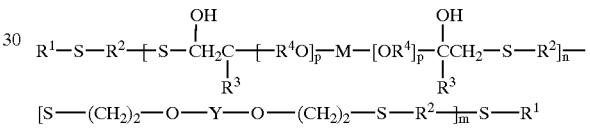

[S—(CH$_2$)$_2$—O—Y—O—(CH$_2$)$_2$—S—R$^2$—]$_m$S—R$^1$ wherein R$^1$ is H, C$_{1-6}$ alkyl, C$_{1-6}$ alkyl alcohol, C$_{1-6}$ alkyl substituted with at least one of:

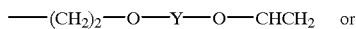

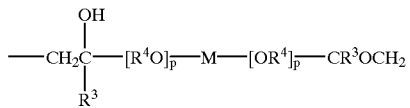

—NHR$^5$ wherein R$^5$ is a C$_{1-6}$ alkyl,

R$^2$ is C$_{2-6}$ alkyl, C$_{6-8}$ cycloalkyl, C$_{6-10}$ alkylcycloalkyl, —[—(CH$_2$)$_r$—Q—]$_s$—(CH$_2$)$_t$—, or C$_{1-2}$ alkyl substituted forms thereof, wherein r is an integer value from 2 to 8, Q is a heteroatom selected from the group consisting of: O, S, —NH— and —NCH$_3$—, s is an integer value from 1 to 5, and t is an integer value from 2 to 10, R$^3$ is H or C$_{1-4}$ alkyl, R$^4$ is —CH$_2$— or R$^2$, M is a C$_{6-20}$ aryl, or C$_{6-20}$ aryl substituted with at least one C$_{1-8}$ alkyl group, or a N or O heteroatom, Y is C$_{2-20}$ alkyl, C$_{6-20}$ cycloalkyl, C$_{6-10}$ alkylcycloalkyl, or —[—(CH$_2$)$_r$—Q—]$_s$—(—CH$_2$—)$_t$—, n is an integer value from 1 to 60, m is an integer value from 1 to 60, and p is an integer value from 1 to 10, wherein the polythioether has a viscosity at 20° C. of less than 1000 poise.

2. The polythioether of claim 1 wherein R$^1$ is H.

3. The polythioether of claim 1 wherein m is greater than n.

4. The polythioether of claim 1 wherein $R^3$ is H.

5. The polythioether of claim 1 wherein M is $C_6$ aryl.

6. The polythioether of claim 1 wherein M is $C_6$ aryl substituted with at least one C-8 alkyl group.

7. The polythioether of claim 1 wherein Y is selected from the group consisting of: ethyl, butyl, hexyl, and compounds where r is 2, s is 2, Q is oxygen and s is 1 to 4.

8. The polythioether of claim 1 having a molecular weight between 1000 and 6000 Daltons.

9. The polythioether of claim 1 having a glass transition temperature of less than −40° C.

10. A polythioether comprising:

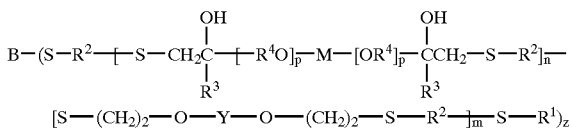

where B is a z-valent group of a polyfunctionalizing agent, z is an integer value from 3 to 6, $R^2$ is $C_{2-6}$ alkyl, $C_{6-8}$ cycloalkyl, $C_{6-10}$ alkylcycloalkyl, $-[-(CH_2)_r-Q-]_s-(CH_2)_t-$, or $C_{1-2}$ alkyl substituted forms thereof, wherein r is an integer value from 2 to 8, Q is a heteroatom selected from the group consisting of: O, S, —NH— and —NCH$_3$—, s is an integer value from 1 to 5, and t is an integer value from 2 to 10, $R^3$ is H or $C_{1-4}$ alkyl, $R^4$ is —CH$_2$— or $R^2$, M is a $C_{6-20}$ aryl, $C_{6-20}$ aryl substituted with at least one $C_{1-8}$ alkyl group, or a N or O heteroatom, Y is $C_{2-20}$ alkyl, $C_{6-20}$ cycloalkyl, $C_{6-10}$ alkylcycloalkyl, or $-[-(CH_2)_r-Q-]_s-(-CH_2-)_t-$, n is an integer value from 1 to 60, m is an integer value from 1 to 60, and p is an integer value from 1 to 10, wherein the polythioether has a viscosity at 20° C. of less than 1000 poise.

11. The polythioether of claim 10 wherein z is 3.

12. The polythioether of claim 10 wherein B is selected from the group consisting of: triallylisocyanurate and triallylcyanurate.

13. The polythioether of claim 11 having an average functionality between 2.05 and 3.00.

14. A process for forming a polythioether according to claim 1 comprising the steps of:

reacting a polythiol with either an aromatic polyepoxide or a polyvinyl ether to form a prepolymer; and combining said prepolymer with the other of said aromatic polyepoxide or said polyvinyl ether.

15. The process of claim 14 wherein n+m+1 mols of said polythiol are reacted with m mols of said aromatic polyepoxide and n mols of said polyvinyl ether.

16. The process of claim 14 wherein n+m mols of said polythiol are reacted with n+1 mols of said aromatic polyepoxide and m mols of said polyvinyl ether.

17. The process of claim 14 wherein n+m mols of said polythiol are reacted with n mols of said aromatic polyepoxide and m+1 mols of said polyvinyl ether.

18. The process of claim 14 further comprising the addition of a free radical catalyst.

19. A curable composition comprising:

42 to 80 weight percent of a polythioether polymer according to claim 1, 0.3 to 15 weight percent of a lightweight filler and 0.1 to 20 weight percent of a curing agent.

20. The curable composition of claim 19 further comprising an additive selected from the group consisting of: pigments, cure accelerators, surfactants, adhesion promoters, thixotropic agents and solvents.

21. The curable composition of claim 20 wherein said lightweight filler comprises microspheres.

22. The curable composition of claim 20 wherein said lightweight filler comprises an amorphous material.

23. The use of a polythioether according to claim 1 upon cure as an aerospace sealant.

* * * * *

UNITED STATES PATENT AND TRADEMARK OFFICE
CERTIFICATE OF CORRECTION

PATENT NO. : 6,486,297 B2  
DATED : November 26, 2002  
INVENTOR(S) : Zook et al.

Page 1 of 1

It is certified that error appears in the above-identified patent and that said Letters Patent is hereby corrected as shown below:

Title page,
Item [57], ABSTRACT,

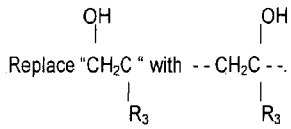

Column 1,
Line 52, replace "modem" with -- modern --.

Column 2,
Line 4, replace "fuimed" with -- fumed --.
Line 16,

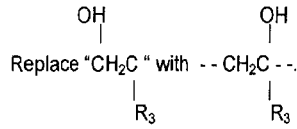

Column 6,
Line 30,

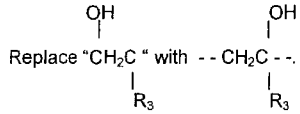

Signed and Sealed this

Fifth Day of August, 2003

JAMES E. ROGAN  
*Director of the United States Patent and Trademark Office*